April 12, 1932. J. O. BETTERTON 1,853,539
PROCESS FOR REMOVAL OF BISMUTH FROM LEAD
Filed March 27, 1930
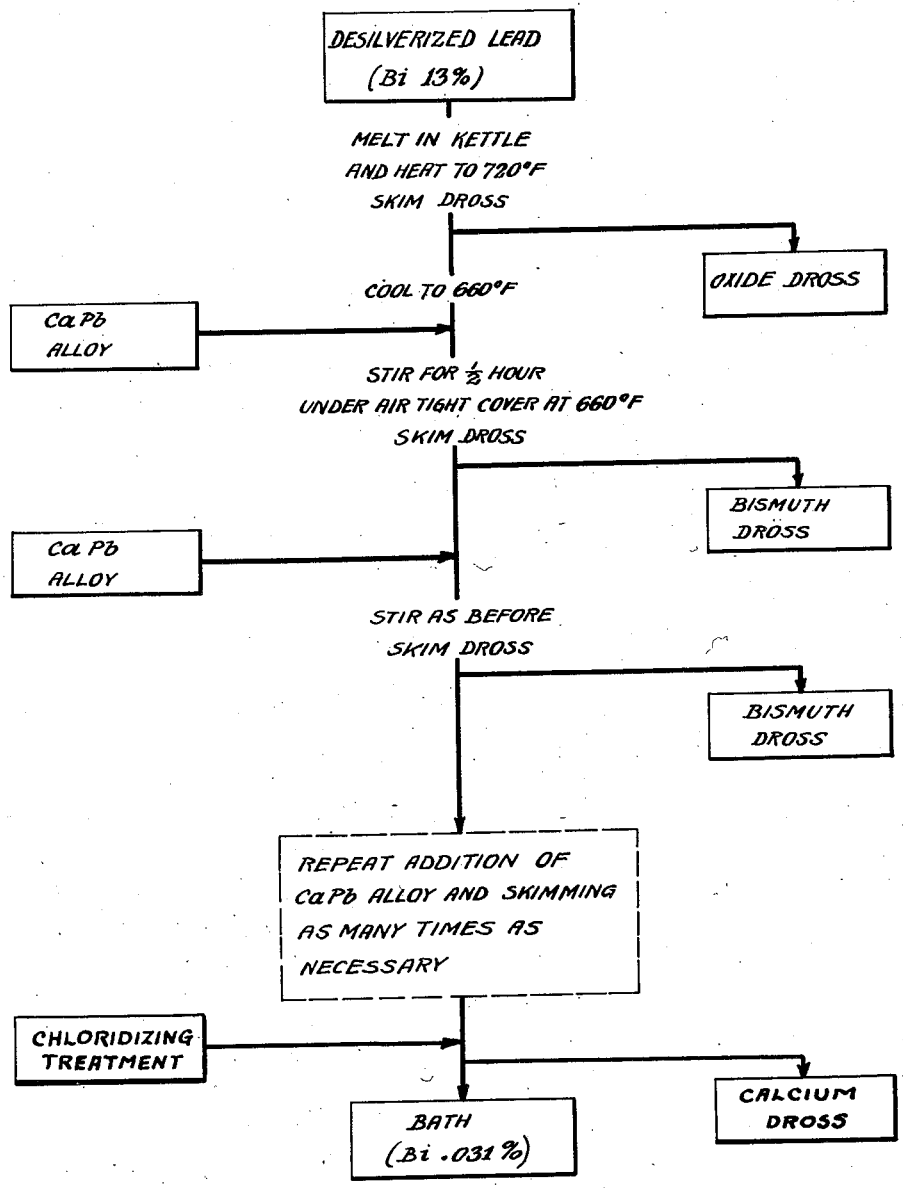
INVENTOR
Jesse O. Betterton
BY HIS ATTORNEY
Albert M. Austin Patented Apr. 12, 1932

1,853,539

UNITED STATES PATENT OFFICE

JESSE OATMAN BETTERTON, OF OMAHA, NEBRASKA, ASSIGNOR TO AMERICAN SMELTING AND REFINING COMPANY, OF NEW YORK, N. Y., A CORPORATION OF NEW JERSEY

PROCESS FOR REMOVAL OF BISMUTH FROM LEAD

Application filed March 27, 1930. Serial No. 439,526.

This invention relates to the separation of metals, and more particularly to the removal of bismuth from lead.

The invention may be specifically applied to the removal of bismuth from refined or desilverized lead and provides for reducing the bismuth content thereof to a value sufficiently low to meet the corroding lead specifications. The process is carried out by the use of calcium as a reagent to form a slag containing the major portion of the bismuth content of the metal. A process for accomplishing this was set forth in detail in my copending application, Serial No. 352,913, filed April 5, 1929, for removal of bismuth from lead. In that application the bismuth was removed by a calcium treatment together with a selective freezing in which the bismuth content of the bath was further reduced by the formation of blocks and rims.

In accordance with the present invention the bismuth content is reduced to the desired point by a multiple calcium treatment without the necessity for selected freezing unless an extremely low bismuth content is required. This improved result is obtained by applying the calcium in a plurality of stages and separately skimming the bath after each stage. The process also provides for the removal of the calcium from the bath by treatment with chlorine under a slag which prevents oxidation of the lead and causes the resultant slag to remain in a fluid condition.

The invention further consists in the new and novel features of operation and the new and original arrangements and combinations of steps in the process hereinafter described and more particularly set forth in the claims.

Although the novel features which are believed to be characteristic of this invention will be particularly pointed out in the claims appended hereto, the invention itself, as to its objects and advantages, the mode of its operation and the manner of its organization may be better understood by referring to the following description in which a particular commercial embodiment thereof is disclosed. It will be understood however, that the processes and the steps thereof may be modified in various respects without departing from the broad spirit and scope of the invention.

The drawing is a flow sheet illustrating the present process.

In the following description and in the claims the various steps in the process and the details comprising the invention will be identified by specific names for convenience but they are intended to be as generic in their application as the art will permit.

The process may be carried out for treating lead which has previously been refined and desilverized by melting the lead in a suitable kettle and raising the temperature thereof to approximately 720° F., at which temperature the bath is skimmed free from the oxide dross. The lead may be then cooled to approximately 660° F., which temperature is preferably maintained throughout the various stages of calcium treatment to be described. A predetermined quantity of calcium as, for example, a calcium lead alloy is then added to the bath and allowed to melt therein and the bath is stirred for a considerable period of time, such as half an hour, preferably under an air-tight cover. A high bismuth dross is then formed on the top of the bath which is skimmed and treated in any desired manner for the recovery of the metal values therefrom.

After the removal of the first high bismuth dross a further quantity of calcium is added to the bath and the bath is stirred and skimmed as before to remove a second high bismuth dross.

This addition of calcium and skimming may be continued any desired number of times to reduce the bismuth content of the bath to the desired value. In a particular instance it was found that five stages of calcium treatment and skimming were required.

As a specific example, a quantity of desilverized lead containing .13% of bismuth was treated five times with a calcium lead alloy in such quantities that half a pound of calcium was used per ton of lead under treatment. After successive skimmings the bismuth content of the bath was found to have been steadily reduced as follows: first skimming, bismuth .122%; second skimming, bismuth .106%; third skimming, bismuth .086%; fourth skimming, bismuth. 0.52%; fifth skimming, bismuth .031%.

It is to be noted from the above figures that approximately 75% of the bismuth was removed from the bath in these operations. The various drosses contained bismuth in the following percentages: 1—.46%; 2—.98%; 3—1.18%; 4—1.91%; 5—1.1%.

The same quantity of calcium was added in each of the stages in the example above cited and the resultant debismuthizing proceeded to a greater extent than would have been possible had all the calcium been added in one step.

It is to be understood that the temperature is maintained at approximately 660° F. throughout the above process. This may be accomplished by continuously applying the required amount of heat to the debismuthizing kettle or it may be accomplished in effect by intermittently heating the kettle whenever the temperature drops below a predetermined value such as 650° F.

After the final calcium treatment and skimming the temperature of the bath may be allowed to fall to approximately 650° F. and the bath may then be reheated to 665° F. and again stirred for a substantial period of time, such as fifteen to twenty minutes. A final bismuth dross may then be removed for further decreasing the bismuth content of the bath.

After the bismuth has been removed in the manner above mentioned, the calcium may be removed from the bath by applying zinc chloride thereto in sufficient quantities to form a cover for the entire bath and maintain the same out of contact with the air. The temperature of the bath is then raised to approximately 750° F. and chlorine gas is applied thereto in sufficient quantities to unite with the calcium and form a calcium chloride slag. The zinc chloride cover prevents the oxidation of lead and the formation of the litharge which would be infusible at the temperature employed. By using the zinc chloride cover the calcium reacts with any chloride that may be formed and thereby completely removing the calcium before substantial quantities of lead chloride are produced. The dross thus formed is fluid at the temperatures employed and may be readily handled. This is removed from the bath and the lead may be applied to any convenient apparatus for further treatment or for the market.

It is to be understood that the various temperatures which are mentioned are given by way of example only and not as a limitation upon the present invention. These temperatures were found suitable in a specific instance. It is also evident that the invention may be applied to the treatment of various other metals and is not to be limited to the specific metals herein described Although certain novel features of the invention have been shown and described and are pointed out in the annexed claims, it will be understood that various omissions, substitutions and changes in the several steps of the process and in its operation may be made by those skilled in the art without departing from the spirit of the invention.

What is claimed is:

1. The process of treating metals to remove bismuth therefrom which comprises adding a calcium-yielding substance to said metals in a plurality of stages whereby a high bismuth dross is obtained, and skimming said dross after each calcium addition and removing the calcium from the bath by chloridizing treatment.

2. The process of treating lead for the removal of bismuth therefrom which comprises heating said lead to form a bath and adding thereto in a plurality of stages a calcium lead alloy and stirring and skimming after each of said additions to remove the high bismuth dross therefrom and removing the calcium from the bath by chlorine treatment.

3. The process of treating lead for the removal of bismuth therefrom which comprises heating said lead to a temperature of approximately 660° F. and adding thereto a calcium lead alloy, stirring and skimming to remove the high bismuth dross and repeating the above operation at approximately the same temperature a plurality of times to progressively lower the bismuth content of the bath and removing the calcium from the bath by chlorine treatment.

4. The process of treating lead to remove bismuth therefrom which comprises heating said lead to a temperature of approximately 720° F., skimming the oxide dross therefrom, cooling said bath to a temperature of approximately 660° F. and adding thereto a lead calcium alloy, stirring to form an intimate mixture and removing the resultant dross, repeating the calcium addition, stirring and skimming a plurality of times at approximately the same temperature to lower the bismuth content of the bath and removing the calcium from the bath by chlorine treatment.

5. The process of treating lead to remove bismuth which comprises melting said lead to form a bath and adding calcium thereto and skimming the resultant dross, repeating the calcium addition and skimming a plurality of times, adding a zinc chloride cover to said bath and applying chlorine thereto to form calcium chloride, and removing the chloride dross.

6. The process of treating lead to remove bismuth therefrom which comprises adding a calcium lead alloy to a bath of said lead maintained at a temperature of approximately 660° F., stirring and skimming the resultant dross, repeating the calcium treatment a plurality of times, heating said bath to a temperature of approximately 750° F., adding a zinc chloride cover thereto and applying chlorine gas to said bath to form a calcium chloride dross, and removing the dross therefrom.

7. The process of treating lead for the removal of bismuth which comprises heating a bath of lead to approximately 660° F., applying a calcium lead alloy thereto, stirring and skimming the resultant dross, permitting the temperature to fall to approximately 650° F. during said treatment, then reheating the bath to a temperature of approximately 660° F., stirring and removing further quantities of dross then adding a zinc chloride cover and applying chlorine gas to form calcium chloride, and removing said calcium chloride as a dross.

In testimony whereof I have hereunto set my hand.

JESSE OATMAN BETTERTON.